(12) United States Patent
Kirch

(10) Patent No.: US 7,117,820 B2
(45) Date of Patent: Oct. 10, 2006

(54) BIRD CAGE LADDER

(75) Inventor: Robert J. Kirch, Aurora, CO (US)

(73) Assignee: Aspen Pet Products, Inc., Denver, CO (US)

( * ) Notice: Subject to any disclaimer, the term of this patent is extended or adjusted under 35 U.S.C. 154(b) by 0 days.

(21) Appl. No.: 11/049,255

(22) Filed: Feb. 1, 2005

(65) Prior Publication Data

US 2005/0126506 A1    Jun. 16, 2005

Related U.S. Application Data

(63) Continuation of application No. 10/634,461, filed on Aug. 4, 2003, now Pat. No. 6,883,464.

(51) Int. Cl.
*A01K 31/06* (2006.01)

(52) U.S. Cl. .......................... 119/467; 182/93; 119/706

(58) Field of Classification Search ................ 119/459, 119/467, 468, 706, 847; 182/93, 97, 206; 4/496; 114/362
See application file for complete search history.

(56) References Cited

U.S. PATENT DOCUMENTS

| | | | |
|---|---|---|---|
| 319,920 A * | 6/1885 | Molyneux | 182/190 |
| 458,023 A * | 8/1891 | Kimball et al. | 182/70 |
| 2,690,159 A | 9/1954 | Sherry | |
| 3,029,788 A | 4/1962 | Voss | |
| 3,741,340 A * | 6/1973 | Andrews | 182/196 |
| 4,089,390 A | 5/1978 | McLain | |
| 4,090,587 A | 5/1978 | Pyle | |
| 4,199,041 A | 4/1980 | Gutner | |
| 4,257,492 A | 3/1981 | Rasada, Jr. et al. | |
| 4,434,871 A | 3/1984 | Niedworok | |
| 4,572,330 A | 2/1986 | Langevin | |
| 4,880,200 A | 11/1989 | Champagne et al. | |
| 4,919,182 A | 4/1990 | Proulx et al. | |
| 4,938,312 A | 7/1990 | Trail | |
| 5,012,895 A | 5/1991 | Santos | |
| 5,186,588 A | 2/1993 | Sutton et al. | |
| 5,228,411 A | 7/1993 | O'Rourke | |
| 5,332,063 A | 7/1994 | Amacker | |
| 5,413,068 A | 5/1995 | Segal | |
| 5,474,025 A | 12/1995 | Lee | |

(Continued)

FOREIGN PATENT DOCUMENTS

JP          07227170         8/1995

OTHER PUBLICATIONS

"Snaps, Spring Snaps, Snap Hooks", UMX—Universal Mercantile Exchange, Inc., located at http:www.umei.com/spring-snaps-1-10.htm, 3 pages, printed on Feb. 20, 2002.

(Continued)

*Primary Examiner*—Robert P. Swiatek
(74) *Attorney, Agent, or Firm*—Dorsey & Whitney LLP

(57) ABSTRACT

A bird cage ladder equipped with a locking connection mechanism that is biased toward a closed position and is easy to install and remove from a bird cage. Particular embodiments of the present invention have the flexibility to connect with various shaped bird cages. Other embodiments provide additional ladder stability by limiting the range of movement of the ladder from side-to-side. Utilization of a locking connection mechanism as disclosed makes it very difficult for the ladder to disengage from the bird cage due to rocking cause by a bird. The locking connection mechanisms are releasably connected to the bird cage and bird cage ladder, allowing the bird cage ladder to be easily installed and removed from the bird cage.

3 Claims, 7 Drawing Sheets

U.S. PATENT DOCUMENTS

D391,691 S     3/1998    Edlebeck et al.
6,044,930 A     4/2000    Hayman
6,158,549 A    12/2000    Hartman, Jr.
6,651,776 B1   11/2003    Montecer, Jr.

OTHER PUBLICATIONS

"Bolt Snaps, O-Rings, D-Rings, Tri-Rings, Snap Hooks", UMX—Universal Mercantile Exchange, Inc., located at http://www.umei.com/hooks/bolt-snaps-1-20.htm, 3 pages, printed on Feb. 20, 2002.

* cited by examiner

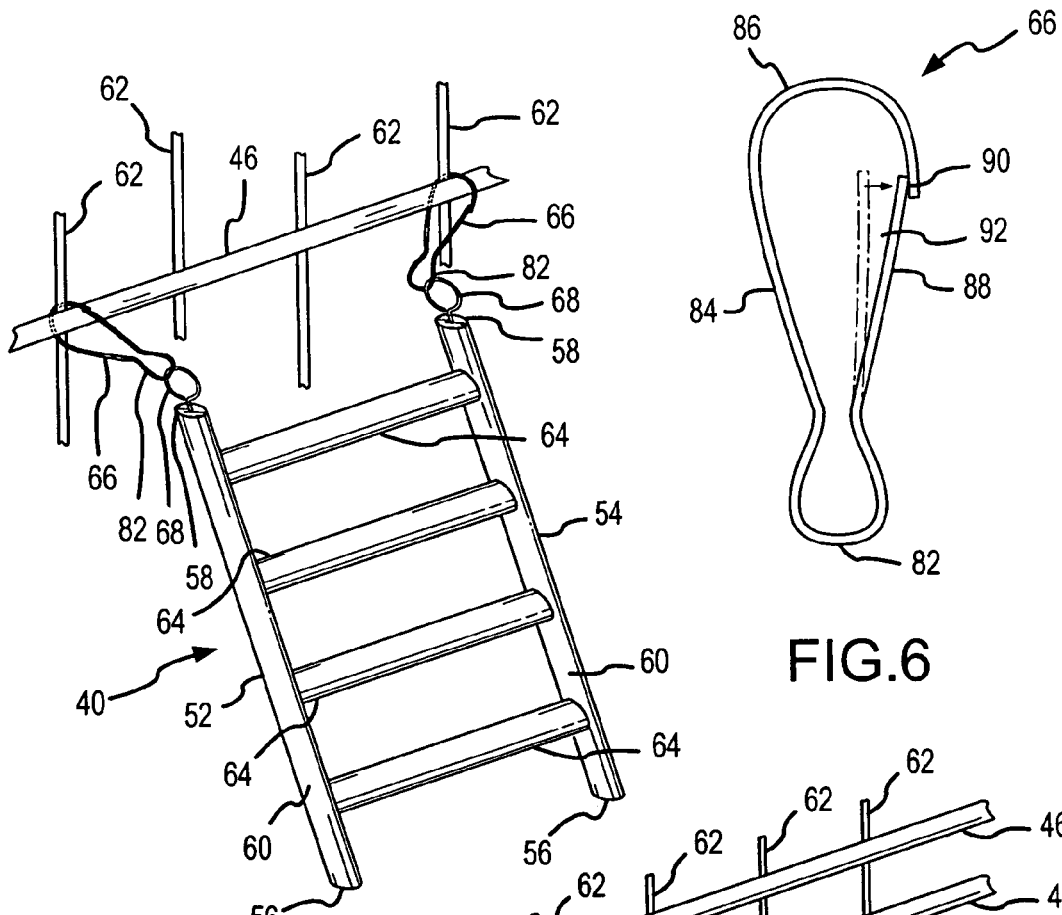
FIG.6
FIG.7B
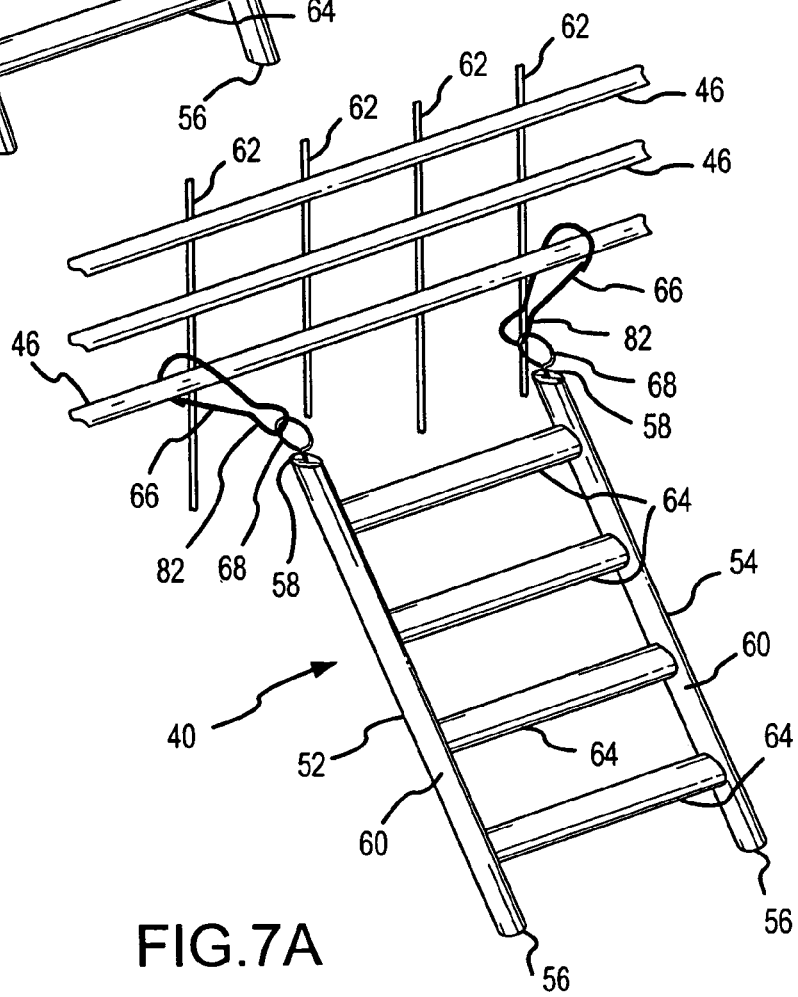
FIG.7A

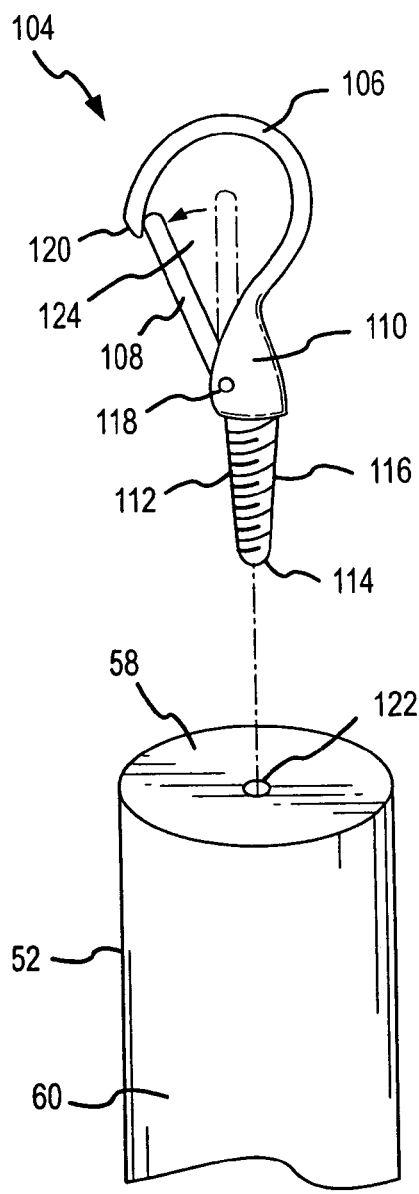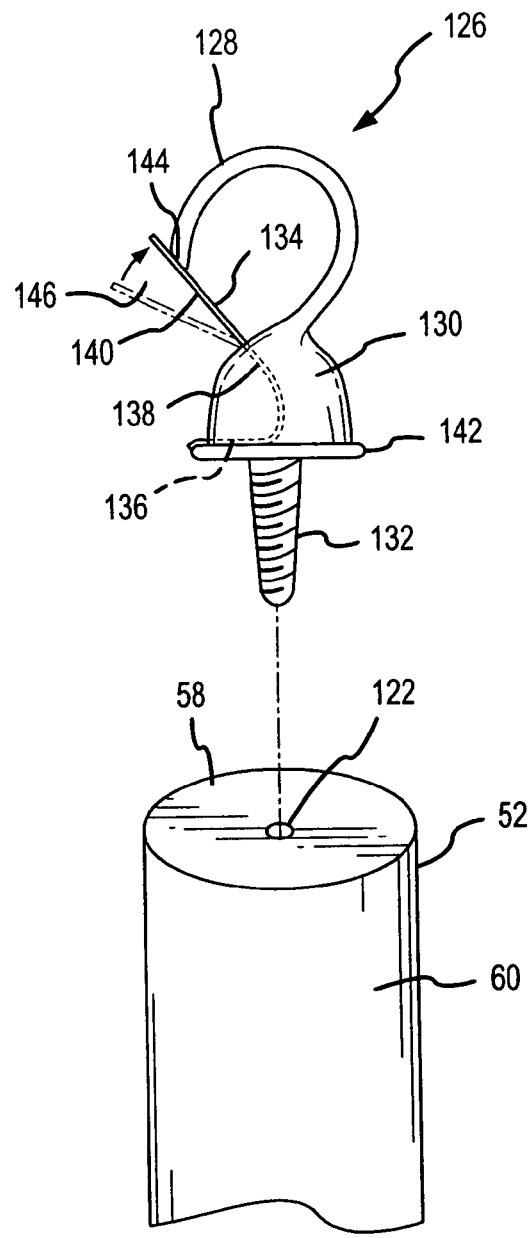
FIG.10
FIG.11

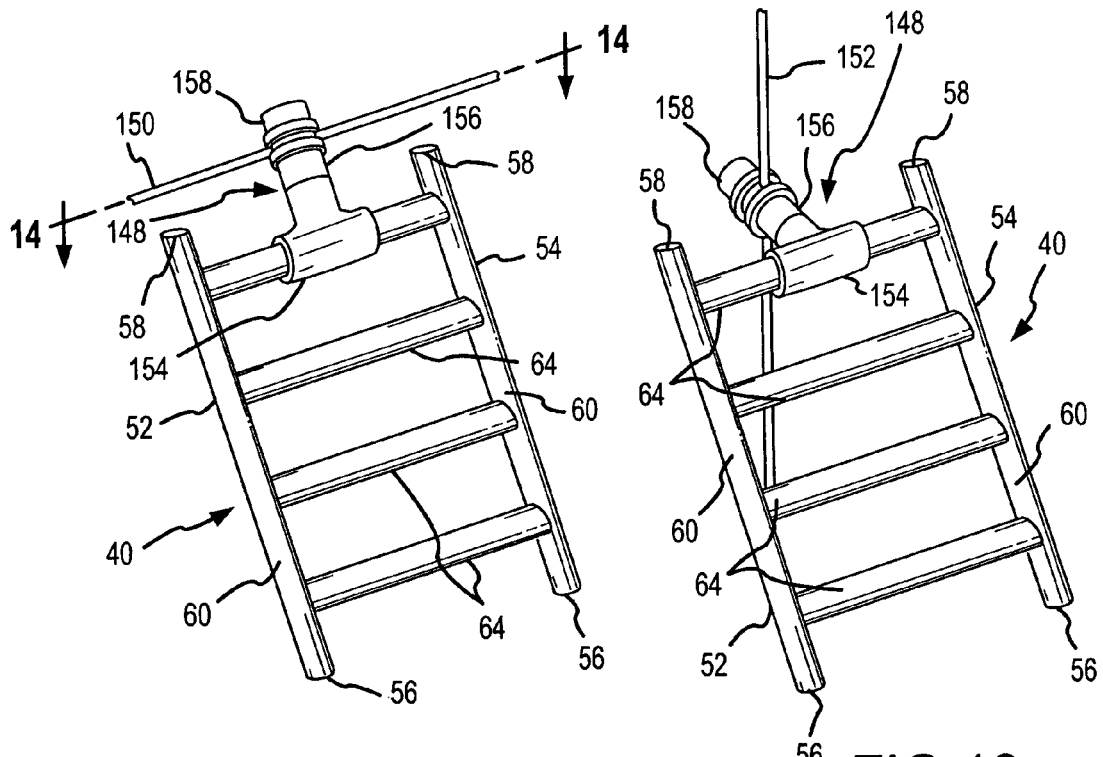
FIG.12
FIG.13
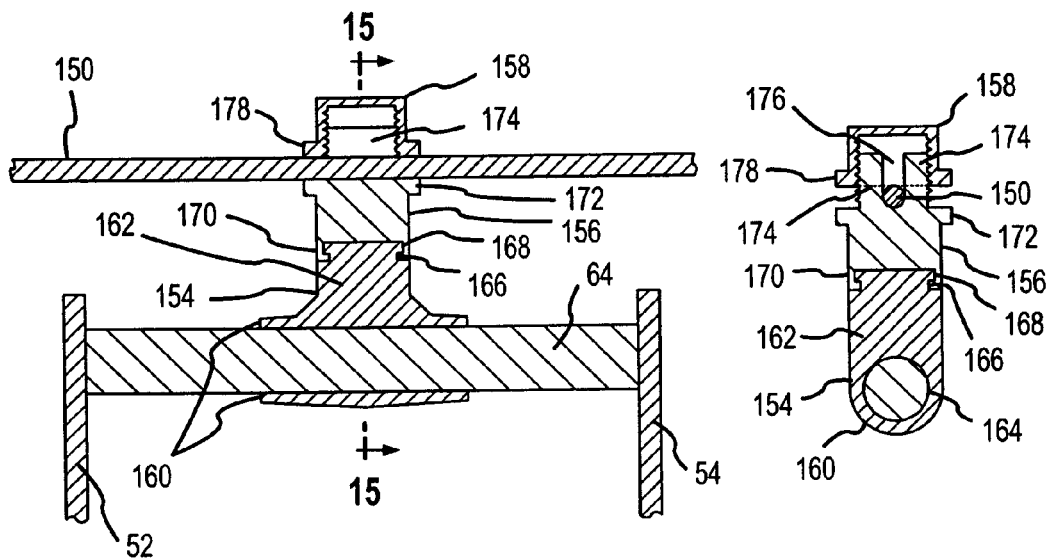
FIG.14
FIG.15

BIRD CAGE LADDER

CROSS REFERENCE TO RELATED APPLICATIONS

This application is a continuation of U.S. patent application Ser. No. 10/634,461, filed Aug. 4, 2004, issued as U.S. Pat. No. 6,883,464 on Apr. 26, 2005, and entitled, "Bird Cage Ladder", which is incorporated herein by reference as if fully set forth.

BACKGROUND OF THE INVENTION a. Field of the Invention

This invention relates to bird cage ladders, and more specifically relates to bird cage ladders equipped with a locking connection mechanism to prevent the ladder from falling off a cage.

b. Background Art

A typical bird cage 10 is depicted in prior art FIG. 1. Bird cages 10 come in various sizes and shapes and are typically constructed of thin metal bars 12 spaced close to one another so as to admit light and air while preventing the bird's escape. Ladders 14 constructed for bird cages 10 are well known in the art. These ladders are typically used by birds to access other areas of a cage 10 and to provide perches at various levels in the bird cage 10 for a bird to rest upon. The bottoms 16 of many bird cages 10 available on the market are constructed of thin metal bars to allow food, feathers, and feces to fall through the bars and into a catch tray 18 for easy clean-up, as shown in prior art FIG. 1. Because these cage bottoms 16 are constructed of thin metal bars and do not have a flat plane on the bottom of the cage 10, it is impractical to construct a bird cage ladder 14 that is stably supported by the bottom of the bird cage. Therefore, many bird cage ladders 14 are constructed so that they can attach to the bars 12 of the bird cage 10 or be suspended therefrom. In this scenario, the bottom of the ladder 14 rests precariously on the bottom 16 of the cage 10. Many of these ladders 14 utilize open hooks 20 to hang the ladder 14 from the bird cage bars 12. As shown in FIG. 1, a ladder 14 utilizing open hooks 20 can be hung from the bird cage bars 12 on the cage sidewalls 22 in a traditional manner. While not depicted herein, the ladder 14 in FIG. 1 can also be hung from the bars 12 on the top 24 of the cage 10. Although an open hook design makes it easier for a user to install and remove a bird ladder 14 from the cage 10, the open hook design may become dislodged from the bars 12 of the cage 10 when a bird climbs on or swings on the ladder 14. In addition, the open hook design provides little or no flexibility for a user to secure a ladder from the top of a domed style bird cage due to its curved shape.

BRIEF SUMMARY OF THE INVENTION

The instant invention provides a bird cage ladder with a locking connection mechanism that is biased toward a closed position and is easy to install and remove from a bird cage. The locking connection mechanism provides a closed configuration wherein the locking connection completely surrounds or envelopes a bird cage bar, unlike an open hook connection that provides a gap in its perimeter. Because the locking connection mechanism is biased toward a closed position is connected with a bird cage, some user action is required to disengage the mechanism, as opposed to an open hook connection that may become disengaged from the cage as a result of a bird's movements on the ladder. Additionally, because the locking connection mechanisms are releasably connected to the bird cage and bird cage ladder, the bird cage ladder can be easily installed and removed from the bird cage.

In one embodiment of the present invention, a bird cage ladder comprises a first rung support member and a second rung support member, both connected with at least one rung. A first eyelet is connected with the first rung support member and a second eyelet is connected with the second rung support member. A first clip hook having a first arm biased in a first closed configuration is connected with the first eyelet, and a second clip hook having a second arm biased in a second closed configuration is connected with the second eyelet.

In another embodiment of the present invention, a bird cage ladder comprises a first rung support member, a second rung support member, and at least one rung connected with the first rung support member and the second rung support member. A first ring member is connected with the first rung support member, and a second ring member is connected with the second rung support member. A first clip having a first arm biased in a first closed configuration is connected with the first ring member, and a second clip having a second arm biased in a second closed configuration is connected with the second ring member.

In a further embodiment of the instant invention, a bird cage ladder comprises a first rung support member, a second rung support member, and at least one rung connected with the first rung support member and the second rung support member. A first hook is connected with the first rung support member, and the first hook includes a first arm biased in a first closed configuration. A second hook is connected with the second rung support member, and the second hook includes a second arm biased in a second closed configuration.

In yet another embodiment of the present invention, the ladder for a bird cage comprises a first rung support member, a second rung support member, at least one rung connected with the first rung support member and the second rung support member, and a clasp including a base member and a cap member. The cap member is releasably connected with the base member and the base member is connected with the at least one rung. The embodiment can be configured such that the at least one rung fits through an aperture in the base member. The embodiment may further comprise a bar clasp member connected With the base member, wherein the bar clasp member is releasably connected with the cap member. The cap member and bar clasp member can also define first and second engagement surfaces. The embodiment can also be configured such that the bar clasp member is rotatably connected with the base member.

The features, utilities, and advantages of various embodiments of the invention will be apparent from the following more particular description of embodiments of the invention as illustrated in the accompanying drawings and defined in the appended claims.

BRIEF DESCRIPTION OF THE DRAWINGS

FIG. 6 is a side view of a clip hook.

FIG. 7A is a detailed view of a bird cage ladder connected to a bar of the bird cage using a clip hook connected to a leg of the ladder by an eyelet with the clip hooks spread apart.

FIG. 7B is a detailed view of a bird cage ladder connected to two bars of the bird cage using a clip hook connected to a leg of the ladder by an eyelet with the clip hooks spread apart.

FIG. 10 is a side view of an inward opening J-hook before the inward opening J-hook is attached to a ladder leg.

FIG. 11 is a side view of an outward opening J-hook before the outward opening J-hook is attached to the ladder leg.

FIG. 12 is a detailed view of a bird cage ladder connected to a horizontally oriented bar of the bird cage using a T-clasp connected to a rung of the ladder.

FIG. 13 is a detailed view of the bird cage ladder of FIG. 12 connected to a vertically oriented bar of the bird cage using the T-clasp connected to a rung of the ladder.

FIG. 14 is a cross-sectional view of the T-clasp depicted in FIGS. 12 and 13.

FIG. 15 is a cross-sectional view of the T-clasp taken along line 15—15 of FIG. 14.

DETAILED DESCRIPTION OF THE INVENTION

The present invention provides a bird cage ladder with a locking connection mechanism that is biased toward a closed position. The locking connection mechanisms disclosed herein are easy to install and remove from a bird cage. Some embodiments of the present invention have the flexibility to connect with various shaped bird cages. Other embodiments provide additional ladder stability by limiting the range of movement from side to side. Because the bird cage ladders disclosed herein utilize a locking connection mechanism, it is very difficult for the ladder to disengage from the bars of the cage due to rocking caused by a bird moving about the ladder.

Figure 1:
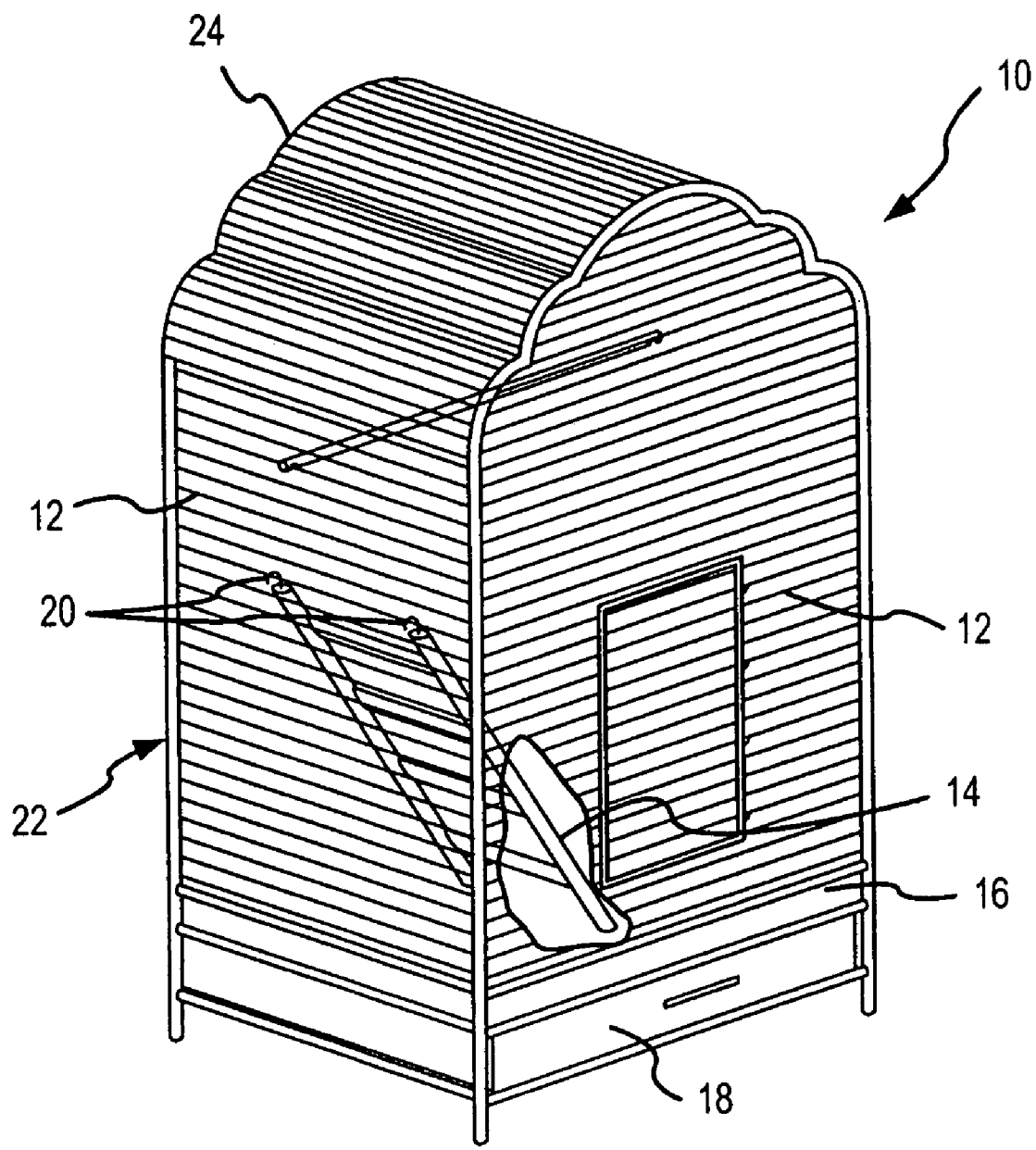
FIG. 1 is an isometric view of a prior art bird cage ladder utilizing open hooks connected with a bird cage shown in partial cut-away.
Figure 2:
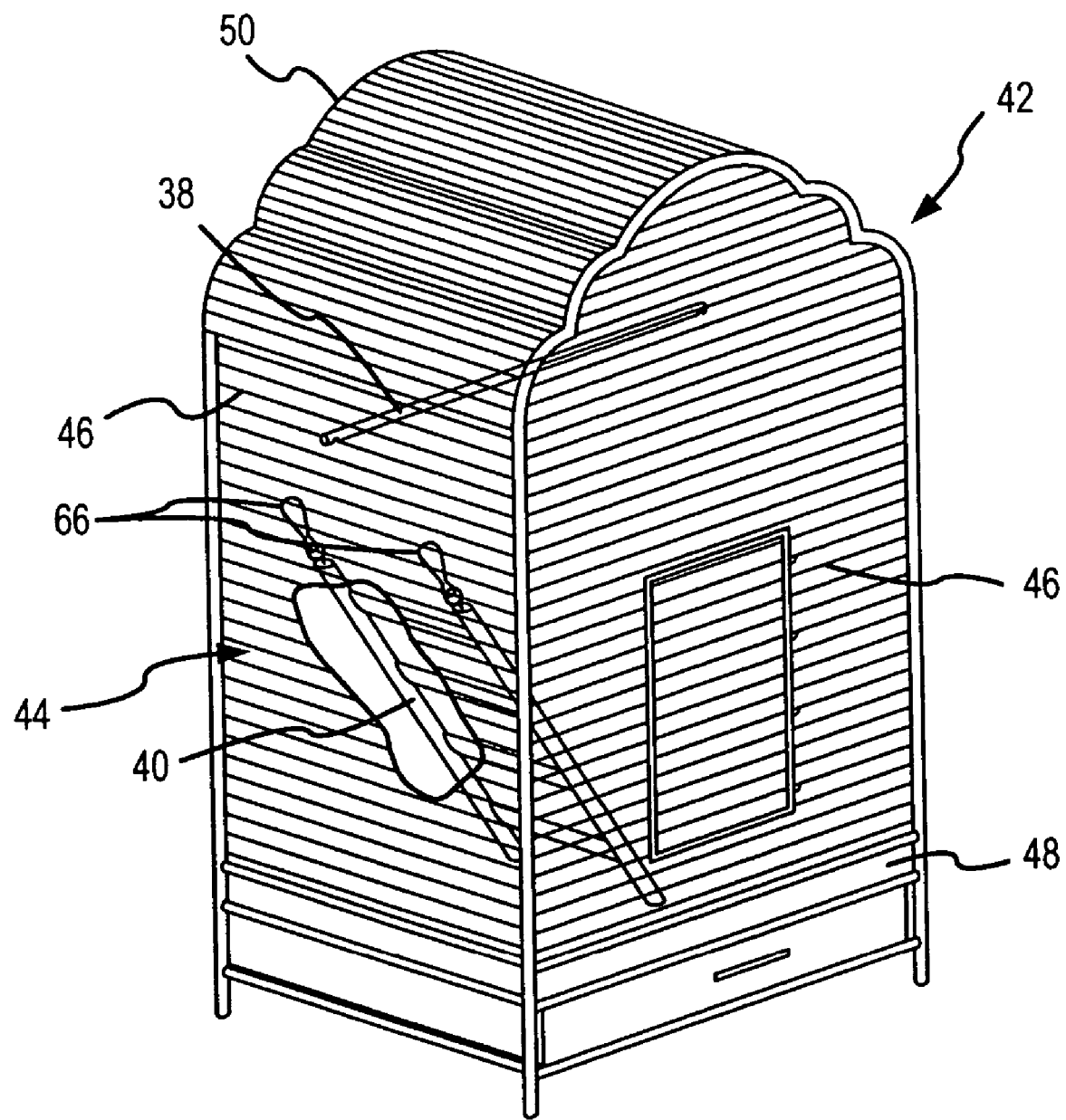
FIG. 2 is an isometric view of a bird cage ladder connected with a bird cage shown in partial cut-away according to one embodiment of the present invention.
Figure 3:
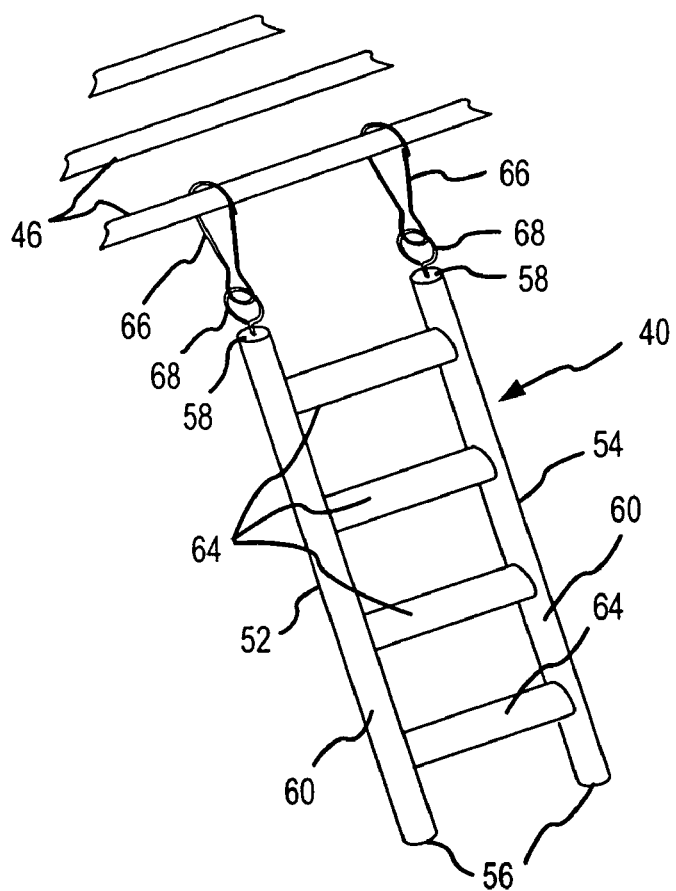
FIG. 3 is a detailed view of a bird cage ladder connected to a bar of the bird cage using a clip hook connected to a leg of the ladder by an eyelet.

FIG. 2 shows a bird cage ladder 40 according to one embodiment of the present invention attached to a bird cage 42. As shown in FIG. 2, the bird cage ladder 40 is attached to a side 44 of the bird cage. The bird cage ladder 40 is leaning at an angle and is suspended generally from bars 46 on the side 44 of the bird cage and supported by a bottom 48 of the bird cage. Depending on the desired application, the bird cage ladder 40 can also be hung from the top 50 of the bird cage. FIG. 3 is a detailed view of the bird cage ladder 40 shown in FIG. 2 suspended from a bird cage bar. As shown in FIGS. 2 and 3, the bird cage ladder 40 has a first leg 52 and a second leg 54. The legs are generally cylindrical in shape and define a bottom end 56, a top end 58, and an outer circumferential surface 60. Alternative embodiments of the bird cage ladder can employ more than two legs with varying shapes and sizes, and the ladder design is not limited to that which is depicted herein.

As shown in FIGS. 2 and 3, the first leg 52 and the second leg 54 are substantially parallel to each other and are connected with a plurality of rungs 64. The rungs 64 provide a place for a bird to stand and allow the bird to maneuver about the cage 42. The rungs 64 may be attached to the first and second legs 52, 54 utilizing glue, screws, nails, friction, or any other suitable fastening means. In another embodiment, the rungs 64 and ladder legs 52, 54 may be formed as an integral unit. The length, diameter, shape, and number of rungs 64 may also vary depending on the application and size of the bird or bird cage 42. In one embodiment of the present invention, the bird cage ladder 40 depicted in FIGS. 2 and 3 is constructed of wood. However, the bird cage ladder 40 can be constructed of any number of materials as known in the art, for example, bamboo, plastic, and aluminum.

Figure 4:
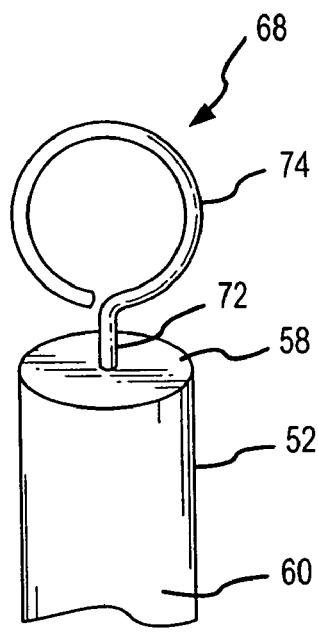
FIG. 4 is a detailed isometric view of a leg of the bird cage ladder of FIG. 2 and an eyelet connected thereto.
Figure 5:
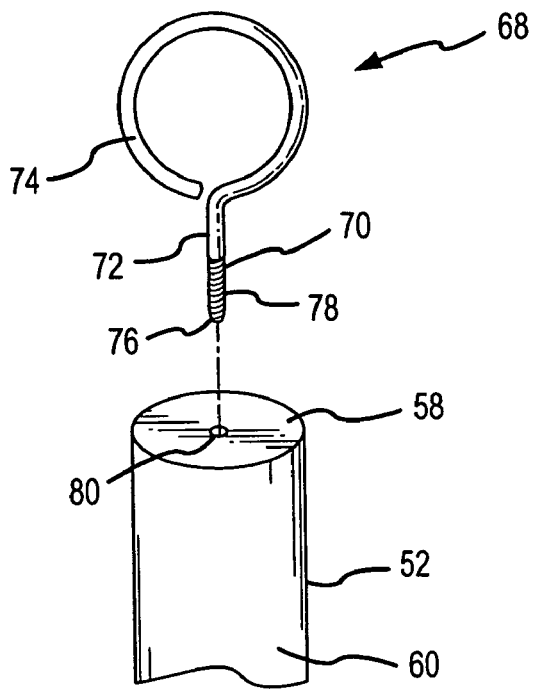
FIG. 5 is an isometric view of the eyelet of FIG. 4 before the eyelet is fastened to the leg of the bird cage ladder.

As shown in FIGS. 2 and 3, the bird cage ladder 40 may be secured to the bird cage 42 with clip hooks 66. The clip hooks are connected to the top ends 58 of the first leg 52 and the second leg 54 of the bird cage ladder 40 by respective eyelets 68. FIG. 4 shows a detailed view of the first leg of the ladder 40 and the attached eyelet 68 depicted in FIGS. 2 and 3. FIG. 5 shows a detailed view of the eyelet 68 removed from the first leg 52. As shown in FIG. 5, the eyelet 68 is composed of a screw portion 70, a base portion 72, and an arcuate eye portion 74. The screw portion 70 extends from the base portion 72 to a pointed tip 76 and is generally cylindrical in shape from the base portion 72 until it tapers to form the pointed tip 76. As shown in FIG. 5, threading 78 encircles the screw portion 70. The arcuate eye portion 74 extends from the base portion 72 in a generally circular path ending at the base portion 72, forming a substantially closed loop.

The eyelet 68 shown in FIG. 5 can be screwed into the top end 58 of a bird cage ladder legs 52, 54 as shown in FIGS. 2–4. To screw an eyelet 68 into a leg 52 of the bird cage ladder 40, a user grasps the eyelet 68 by the eye portion 74 and centers the pointed tip 76 on the top end 58 of a ladder leg 52. The user then pushes the pointed tip 76 into the ladder leg 52 and begins turning the eyelet 68 until the threading 78 is buried within the bird cage ladder leg 52 and the base portion 72 contacts the top 58 of the ladder leg 52. Depending on the relative sizes of the legs 52 and screw portions 70 of the eyelets 68, it may be advantageous to drill a small pilot hole 80 in the leg 52 to prevent splitting the leg material when screwing the eyelet 68 into the leg 52. In an alternative embodiment, the eyelets are screwed into the outer circumferential surface 60 of the legs 52, 54 typically adjacent the top ends 58 of the legs 52, 54 as opposed to the top surface 58.

Once eyelets 68 are installed in the first leg 52 and second leg 54, clip hooks 66 may be attached to the eyelets 68. As shown in FIGS. 2 and 3, clip hooks 66 are used to connect the bird cage ladder 40 with the bars 46 of the bird cage 42. More particularly, the clip hooks 66 connect the bars 46 of the bird cage 42 with the eyelets 68. FIG. 6 shows a detailed view of the clip hook 66. The clip hook 66 is made from a single piece of metal, such as aluminum or steel. The clip hook 66 can also be constructed from other materials such as plastic. As shown in FIG. 6, the single piece of metal is bent to form the shape of the clip hook 66, which is defined by a first arcuate end portion 82, a straight portion 84, a second arcuate portion 86, and a bias portion 88. The clip hook 66 is bent in such a manner that a bias force in the direction shown in FIG. 6 causes the bias portion 88 to press against the first arcuate portion 82. Therefore, the perimeter of the clip hook 66 is normally closed 90.

When installing the clip hook 66 on the eyelet 68, a user applies an opposing force against the bias portion 88 that is greater than the bias force. The bias portion 88 may be moved to a position, represented in FIG. 6 in dash, forming a gap 92 between the bias portion 88 and the second arcuate portion 86. The gap 92 is large enough to accept the thickness of the band forming the arcuate eyelet portion 74. The user then releases the force from the bias portion 88 and allows the bias force to close the gap 92 between the bias portion 88 and the second arcuate portion 86. The eyelet 68 is then preferably positioned within the area of the clip hook 66 bounded by the first arcuate end portion 82. Once clip hooks 66 are installed on the eyelets 68 of both legs 52, 54, the same procedure is used to secure the clip hooks 66 to the bars 46 of the bird cage 42. Again, the gap 92 formed between the bias portion 88 and the second arcuate portion 86 is wide enough to allow the diameter of the bars 46 to pass through. The second arcuate portions 86 of the clip hooks 66 interface with the bars 46, the bird cage 42, and the first arcuate portions 82 interface with the eyelets 68.

Because the clip hooks 66 and eyelets 68 are biased to have closed perimeters, it is nearly impossible for a bird to cause the bird cage ladder 40 to become disengaged from the cage bars 46, for example, by swinging the ladder 40 either back and forth or from side-to-side.

As shown in FIGS. 7A and 7B, some bird cages 42 also include bird cage cross bars 62, which are not depicted in FIG. 2. Cross bars 62 are utilized on some bird cage designs to provide additional reinforcement for the structure of the bird cage 42. The cross bars 62 also provide an added benefit in the ability to connect the bird cage ladder 40 to further mitigate lateral movement of the ladder 40, as discussed in more detail below. For example, as shown in FIG. 3, the manner in which the clip hooks 66 are secured to the bird cage bar 46 also allows for some side-to-side swinging motion of the bird cage ladder 40. Sometimes, it may be desirable to limit the side-to-side swinging motion. In a bird cage 42 with cross bars 62, the clip hooks 66 can be secured to a bar 46 of the bird cage 42 such that the clip hooks 66 extend outwardly from the eyelets 68 at an angle that places the second arcuate portions 86 of the clip hooks 66 at a greater distance from each other along the bird cage bar 46, as shown in FIG. 7A. In this scenario, the second arcuate portions 86 of the clip hooks 66 rest against the cross bars 62. Securing the clip hooks 66 to the bird cage 42 in this manner helps to reduce the side-to-side swinging motion. Similar results can be realized by securing clip hooks 66 to more than one bar 46, i.e., both the bird cage bar 46 and a cross bar 62 of the bird cage 42, as shown in FIG. 7B. It should also be understood that the flexibility of the clip hooks 66 to connect with the bird cage bars 46 at varying distances from each other makes it easier to secure the bird cage ladder 40 to bird cages of varying shapes and sizes.

Figure 8:
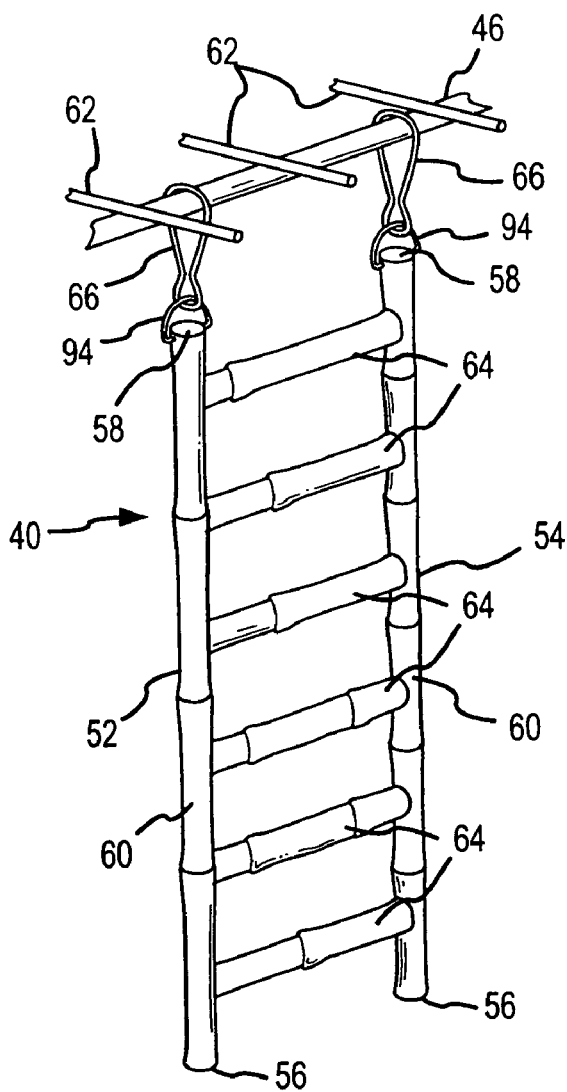
FIG. 8 is a detailed view of a bird cage ladder connected to a bar of a bird cage using a clip hook connected to a leg of the ladder by a D-ring according to another embodiment of the invention.
Figure 9:
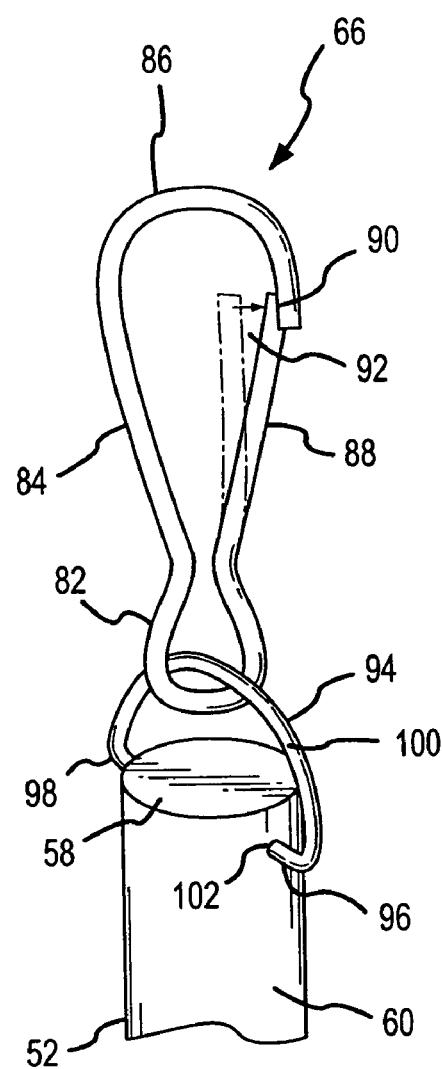
FIG. 9 is a detailed view of a leg of the bird cage ladder of FIG. 8 with a D-ring connecting the clip hook to the ladder leg.

In an alternative embodiment of the present invention, the clip hooks 66 may be fastened to the bird cage ladder 40 with D-rings 94, as shown in FIG. 8. It may also be noted in FIG. 8 that the bird cage ladder 40 may be hung vertically, for example, from the top 50 of the bird cage 42 or from a perch 38 in the cage 42 identified in FIG. 2. As shown in FIG. 9, the D-ring 94 may be made from a single piece of heavy gauge metal wire with a generally circular cross section. The single piece of metal forming the D-ring 94 is bent to a shape that defines a first insertion portion 96, a second insertion portion 98, and a D-shaped arcuate portion 100. The D-shaped arcuate portion 10 extends between the first insertion portion 96 and the second insertion portion 98. The first insertion portion 96 and second insertion portion 98 fit into holes 102 on opposite sides of the outer circumferential surface 60 of the leg 52. It should be noted that one through hole can be utilized as opposed to two blind holes. The first insertion portion 96 and the second insertion portion 98 can fit loosely in the holes 102 such that the D-ring 94 can rotate about the top end 58 of the leg 52. Alternatively, the first insertion portion 96 and the second portion 98 can be secured in the holes 102 to prevent rotation of the D-ring 94. The clip hook 66 is attached to the D-ring 94 in a similar fashion as previously described with reference to the eyelet 68. The clip hook 66 again connects the D-ring 94 with the bird cage 42. Utilization of the D-ring 94 provides for a closed perimeter pivot that makes it nearly impossible for the bird cage ladder 40 to become disengaged from the bird cage 42 due to the bird swinging the ladder 40 back and forth or side-to-side.

The present invention also contemplates other structures for securing the bird cage ladder 40 to the bird cage 42. For example, FIG. 10 shows an inward opening J-hook 104 that can be screwed directly into the bird cage ladder legs 52, 54. The inward opening J-hook defines a hook portion 106, a hinged arm 108, base portion 110, and a tapered screw portion 112. The tapered screw portion 112 extends from the base portion 110 to a tip 114. As shown in FIG. 10, threading 116 surrounds the tapered screw portion 112. The hook portion 106 extends from the base portion 110 in an arcuate path forming a hook shape. The hinged arm 108 is connected with the base portion 110 by a hinge 118 and extends from the base portion 110 to an end of the hook portion 106. A spring (not shown) creates a bias force in the direction shown in FIG. 10 that holds the hinged arm 108 against the end of the hook portion 106.

The inward opening J-hook 104 shown in FIG. 10 can be screwed into the top ends 58 of the bird cage ladder legs 52, 54. To screw the inward opening J-hook 104 into a leg 52, a user grasps the inward opening J-hook 104 by the hook portion 106 and centers the tip 114 on the top end 58 of a leg 52. The user then pushes the tip 114 into the bird cage ladder leg 52 and begins turning the hook portion 106 until the threading 116 is buried within the bird cage ladder leg 52 up to the base portion 110. As previously described, depending on the relative sizes of the legs 52, 54 and screw portions 112, it may be advantageous to drill a small pilot hole 122, as shown in FIG. 10, in the leg 52 to prevent splitting the leg material when screwing the inward opening J-hook 104 into the leg 52. In an alternative embodiment, the inward opening J-hook 104 may be screwed into the outer circumferential surface 60 of the leg 52 as opposed to the top surface 58.

Once inward opening J-hooks 104 are screwed into the bird cage ladder legs 52, 54, the bird cage ladder 40 can be hung on the bird cage bars 46 from the hook portion 106 of the J-hook 104. When securing the bird cage 42 ladder to the bird cage 42 utilizing inward opening J-hooks 104, the user applies an opposing force against the hinged arm 108 exceeding the bias force. The hinged arm 108 is moved to a position, represented in FIG. 10 in dash, forming a gap 124 between the hinged 108 arm and the hook portion 106. The gap 124 is large enough to accept a bird cage bar 46. The user then releases the force from the hinged arm 108 and allows the bias force to close the gap 124 between the hinged arm 108 and the hook portion 106. Because the inwardly opening J-hooks 104 are biased to have a closed perimeter, it is nearly impossible for a bird to cause the bird cage ladder 40 to become disengaged from the cage bars 46 by swinging the ladder 40 back and forth. Because the inwardly opening J-hooks 104 are connected directly with the bird cage ladder 40 without an intermediary link, the inwardly opening J-hooks 104 also nearly eliminate all side-to-side swinging motion of the bird cage ladder 40.

Another embodiment of the present invention shown in FIG. 11 utilizes an outward opening J-hook 126 to secure the bird cage ladder 40 to the bird cage 42. Similar to the inward opening J-hook 104, the outward opening J-hook 126 defines the hook portion 128, base portion 130, and tapered screw portion 132. However, unlike the inward opening J-hook 104, the outward opening J-hook 126 utilizes a snap arm 134. The snap arm 134 is a single piece of flexible material that is bent to define a first portion 136, a second arcuate portion 138, and a third portion 140. The first portion 136 of the snap arm 134 is located inside the base portion 130 and is adjacent to the bottom 142 of the base portion 130. The second arcuate portion 138 is between the first portion 136 and third portion 140, and it abuts a rear wall (not shown) inside of the base portion 130. The third portion 140 extends from the second arcuate portion 138 past the end 144 of the of hook portion 128. The snap arm 134 is connected with the base portion 130 and biased as a spring to create the bias force in the direction shown in FIG. 11 that causes the third portion 140 of the snap arm 134 to press against the end of the hook portion 144. The outward opening J-hook 126 can be screwed into the ladder legs 52, 54 in the same manner as previously described with reference to the inward opening J-hook 104.

Once the outward opening J-hook 126 is screwed into the bird cage ladder legs 52, 54, the bird cage ladder 40 can be hung on the bird cage bars 46 from the hook portion 128. When securing the bird cage ladder 40 to the bird cage 42 utilizing outward opening J-hooks 126, the user applies an opposing force against the bias force of the snap arm 134 that is greater than the bias force. The snap arm moves to a position, represented in FIG. 10 in dash, forming a gap 146 between the snap arm 134 and the hook portion 128. The gap 146 is large enough to accept a bird cage bar 46. The user then releases the force from the snap arm 134 and allows the bias force to close the gap 146 between the snap arm 134 and the hook portion 128. Because the outward opening J-hooks 126 are biased to have a closed perimeter, it is nearly impossible for a bird to cause the bird cage ladder 40 to become disengaged from the cage bars 46 by swinging the ladder 40 back and forth.

Similar embodiments of the present invention may utilize various other configurations and combinations of hooks and snaps biased to have a closed perimeter, and the present invention should not be construed as limited to those embodiments depicted herein. For example, the inward opening J-hook 104 can be used in combination with a swivel hook similar in design to Stanley® Hardware's round eye swivel with spring snap, Model No. 640402.

Other devices can also be used to stably secure a bird cage ladder 40 to the bars 46 of a bird cage 42 without the use of hooks and snaps. For example, a T-clasp 148, such as the one depicted in FIGS. 12 and 13 could be utilized. In FIG. 12, a T-clasp 148 is used to attach the bird cage ladder 40 to a horizontally oriented bar 150 of a bird cage 42, and in FIG. 13, the T-clasp 148 is used to attach the bird cage ladder 40 to a vertically oriented bar 152 of a bird cage 42. As described in more detail below, the T-clasp 148 allows a user to connect the ladder 40 to the bars of a bird cage 42 in various orientations without having to reconfigure the T-clasp 148 itself.

Referring to FIGS. 14 and 15, the T-clasp 148 includes a T-base member 154, a bar clasp member 156, and a threaded cap member 158. The T-base member 154 is defined by a rung portion 160 and a connector portion 162 extending from the middle of the rung portion 160. A rung aperture 164 is also located in the rung portion 160. A neck 166 and head portion 168 are defined on an end of the connector portion 162 away from the rung portion 160. The bar clasp member 156 is generally cylindrical in shape and includes a head and neck enveloping portion 170, a first bar engagement surface 172, and a threaded portion 174. A slot 176 is located in the threaded portion 174. The threaded cap member 158 is configured such that it can be screwed onto the threaded portion 174 of the bar clasp member 156. A second bar engagement surface 178 is also located on the threaded cap member 158.

As shown in FIGS. 14 and 15, the head and neck enveloping portion 170 of the bar clasp member 156 connects with the connector portion 162 of the T-base member 154 by enveloping the head portion 168 and neck 166. The connection at the head portion 168 and neck 166 allow the bar clasp member 156 to rotate independently of the T-base member 154, which allows for convenient connections to bird cage bars 46 with various orientations. In order to secure a ladder 40 to a cage 42 using the T-clasp 148, the T-clasp 148 is first connected with a rung 64 of the ladder. The rung 64 is temporarily separated at one end from a ladder leg 52, 54. The T-clasp 148 is then slid onto the ladder rung 64 through the rung aperture 164. The ladder leg 52, 54 is then reattached to the ladder rung 64. Alternately, the T-base member 154 may be of two-piece construction and each half may be placed about the rung 64. The two halves of the T-base member 154 may snap fit together, or be held together by the head and neck enveloping portion 17 clasping about the head portion 168 and neck 166, or both. Once secured to the ladder rung 64, the T-clasp 148 is free to rotate about the ladder rung 64. With the threaded cap member 158 removed from the clasp member 156, the clasp member 156 is rotated in order to align the slot 176 with the horizontal bird cage bar 150. The horizontal bird cage bar 150 is then inserted into the slot 176, and the threaded cap member 158 is screwed onto the threaded portion 174 of the bar clasp member 156 until the bar is in contact with the first engagement surface 172 and the second engagement surface 178. The threaded cap member 158 is screwed onto the threaded portion 174 until sufficient pressure is exerted on the horizontal bar 150 by the engagement surfaces 172, 178 so as to prevent the horizontal bar 150 from sliding inside the slot 176. It should be apparent that the T-clasp 148 may be attached to a vertical bird cage bar 152 in a similar manner as shown in FIG. 13.

The T-clasp 148 can be used to connect a bird cage ladder 40 to bars 46 on the sides 44 or the top 50 of a bird cage 42. The configuration of the T-clasp 148 also prevents the ladder 40 from easily disengaging from the bird cage 42 when a bird is stepping or swinging on the ladder 40. It should also be understood that the T-clasp configuration is not limited to that which is depicted herein. For example, a cap member 158 can be connected with the bar clasp member 156 utilizing other means besides threading that still allow for a snug connection, such as friction or snap fit arrangements.

Although various embodiments of this invention have been described above with a certain degree of particularity or with reference to one or more individual embodiments, those skilled in the art could make numerous alterations to those disclosed embodiments without departing from the spirit or scope of this invention. It is intended that all matter contained in the above description and shown in the accompanying drawings shall be interpreted as illustrative only of particular embodiments, and not limiting. Changes in detail or structure may be made without departing from the basic elements of the invention as defined in the following claims.

What is claimed is:

1. A ladder for a bird cage comprising:
   a first rigid rung support member;
   a second rigid rung support member;
   at least one rung connected with said first rung support member and said second rung support member;
   a first ring member connected with said first rung support member;
   a second ring member connected with said second rung support member;
   a first releasable clip having a first arm biased in a first closed configuration and connected with said first ring member;
   a second releasable clip having a second arm biased in a second closed configuration and connected with said second ring member; wherein
   said first ring member defines a first insertion portion, a second insertion portion, and an arcuate portion wherein said first insertion portion and said second insertion portion are connected with at least one hole in said first rung support member.

2. The ladder of claim 1 further comprising a plurality of rungs.

3. The ladder of claim 1 wherein said second ring member defines a first insertion portion, a second insertion portion, and an arcuate portion wherein said first insertion portion and said second insertion portion are connected with a hole in said second rung support member.

* * * * *